United States Patent [19]
Zaplatynsky

[11] Patent Number: 4,990,739
[45] Date of Patent: Feb. 5, 1991

[54] PLASMA GUN WITH COAXIAL POWDER FEED AND ADJUSTABLE CATHODE

[75] Inventor: Isidor Zaplatynsky, Fairview Park, Ohio

[73] Assignee: The United States of America as represented by the Administrator of the National Aeronautics and Space Administration, Washington, D.C.

[21] Appl. No.: 376,488

[22] Filed: Jul. 7, 1989

[51] Int. Cl.[5] ..................... B23K 9/00

[52] U.S. Cl. ..................... 219/121.47; 219/121.52; 219/121.48; 219/75; 219/76.16; 427/34

[58] Field of Search ........... 219/76.12, 121.59, 121.48, 219/121.49, 121.5, 121.52, 129.47, 75; 427/34, 32

[56] References Cited

U.S. PATENT DOCUMENTS

| | | | |
|---|---|---|---|
| 2,922,869 | 1/1960 | Giannini et al. | 219/121.47 |
| 3,055,591 | 9/1962 | Shepard | 219/121.47 |
| 3,562,486 | 2/1971 | Hatch et al. | 219/121.52 |
| 3,710,070 | 1/1973 | Hirt et al. | 219/121.47 |
| 3,803,380 | 4/1974 | Ragaller | 219/121.47 |
| 3,894,209 | 7/1975 | Fairbairn | 219/121 P |
| 4,142,089 | 2/1979 | Lau et al. | 219/121 P |
| 4,540,121 | 9/1985 | Browning | 239/13 |
| 4,621,183 | 11/1986 | Takeuchi et al. | 219/121 P |
| 4,627,990 | 12/1986 | Saga et al. | 427/10 |
| 4,650,953 | 3/1987 | Eger et al. | 219/121 PQ |
| 4,739,146 | 4/1988 | Lindland et al. | 219/121 PY |
| 4,780,591 | 10/1988 | Bernecki et al. | 219/121.52 |
| 4,788,408 | 11/1988 | Wlodarczyk et al. | 219/121.52 |
| 4,818,837 | 4/1989 | Pfender | 219/121.52 |

*Primary Examiner*—M. H. Paschall
*Attorney, Agent, or Firm*—Gene E. Shook; John R. Manning; James A. Mackin

[57] ABSTRACT

An improved plasma gun coaxially injects particles of ceramic materials having high melting temperatures into the central portion of a plasma jet. This results in a more uniform and higher temperature and velocity distribution of the sprayed particles. The position of the cathode is adjustable to facilitate optimization of the performance of the gun wherein grains of the ceramic material are melted at lower power input labels.

4 Claims, 3 Drawing Sheets

PLASMA GUN WITH COAXIAL POWDER FEED AND ADJUSTABLE CATHODE

ORIGIN OF THE INVENTION

The invention described herein was made by an employee of the United States Government and may be manufactured and used by or for the Government for governmental purposes without the payment of any royalties thereon or therefor.

TECHNICAL FIELD

This invention is concerned with plasma spraying materials having high melting temperatures. The invention is particularly directed to an improved plasma gun for spraying ceramic materials.

Several models of arc plasma guns are used at the present time to spray metallic or ceramic coatings. All share a similar design. More particularly, in one prior art gun the particles to be sprayed are injected orthogonally to the plasma jet externally. In another prior art gun these particles are injected through a hole or holes in the nozzle.

A major disadvantage in using these prior art plasma guns is that only a portion of the particles penetrate to the central region of the jet. A significant portion of the injected particles is entrained in the external region of the plasma jet which is the cooler portion. Consequently, the injected particles acquire a spectrum of velocities and temperatures. In the case of a ceramic material, such as zirconia, some of the particles are only partially melted while others are not melted at all.

It is, therefore, an object of the present invention to provide an improved plasma gun wherein the particles to be sprayed are injected into the central portion of the plasma jet for optimum heating.

Another object of the invention is to provide an improved plasma jet in which the position of the cathode with respect to the anode can be adjusted to optimize the performance of the gun for a given application.

BACKGROUND ART

U.S. Pat. No. 3,894,209 to Fairbairn discloses a nozzle for an energy beam system. This nozzle utilizes a hollow radio frequency electrode housed in an inner sleeve that is telescopically mounted within an outer sleeve. One or more powders or aggregates are selectively fed axially through a bore in this hollow electrode while a gas is selectively fed through the space around the electrode.

U.S. Pat. No. 4,142,089 to Lau et al is directed to a pulsed coaxial thermal plasma sprayer comprising an elongated conductive tube having an electrode position coaxially therein. Inert gas, such as helium, is mixed with a powdered material, such as a ceramic or a metal, and a controlled amount is injected evenly into the tube.

U.S. Pat. No. 4,650,953 to Eger et al describes a plasma torch having an electrode secured to a liquid cooled electrode holder and formed with a flow passage communicating with a central outlet for delivering an ionizable gas. A nozzle body which surrounds the electrode serves to conduct gas along the outside surface of this electrode.

DISCLOSURE OF THE INVENTION

The objects of the invention are achieved and the problems of the prior art are solved by a plasma gun wherein particles are injected coaxially into the central portion of the plasma jet. This produces a more uniform and higher temperature and velocity distribution of the sprayed particles.

At the same time, the length of the path of the particles in the plasma jet is increased. Also, the feed gas acts as a coolant for the cathode, thus extending its life.

An important feature of the invention is that the position of the cathode is adjustable to facilitate optimization of the gun performance. Tests have shown that zirconia grains plasma sprayed with the new gun can be melted at considerably lower power input levels when compared with commercially available guns of the prior art.

BRIEF DESCRIPTION OF THE DRAWING

The details of the invention will be described in connection with the accompanying drawing wherein.

BEST MODE FOR CARRYING OUT THE INVENTION

Figure 1:
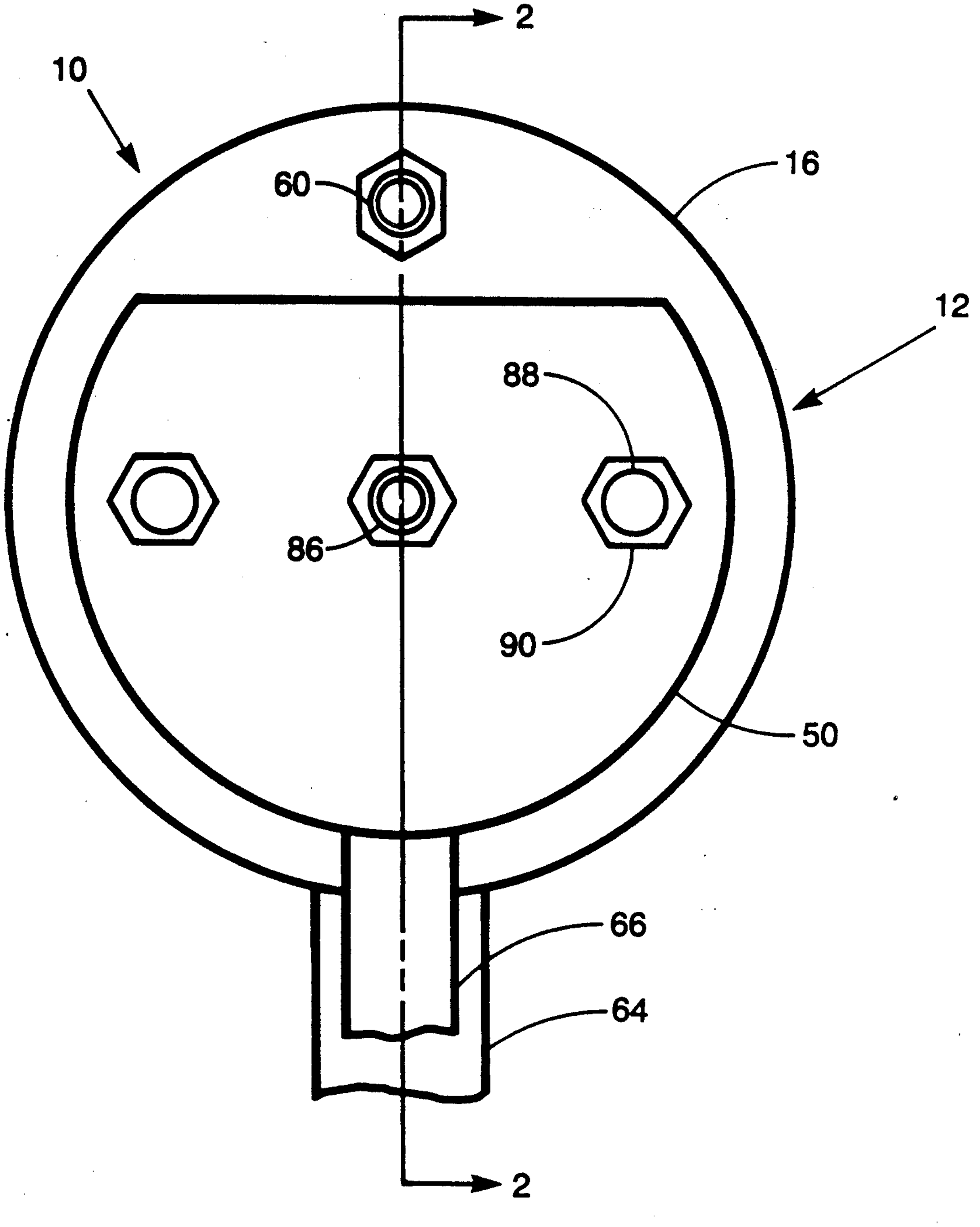
FIG. 1 is a rear elevation view of an arc plasma gun embodying the features of the invention.
Figure 2:
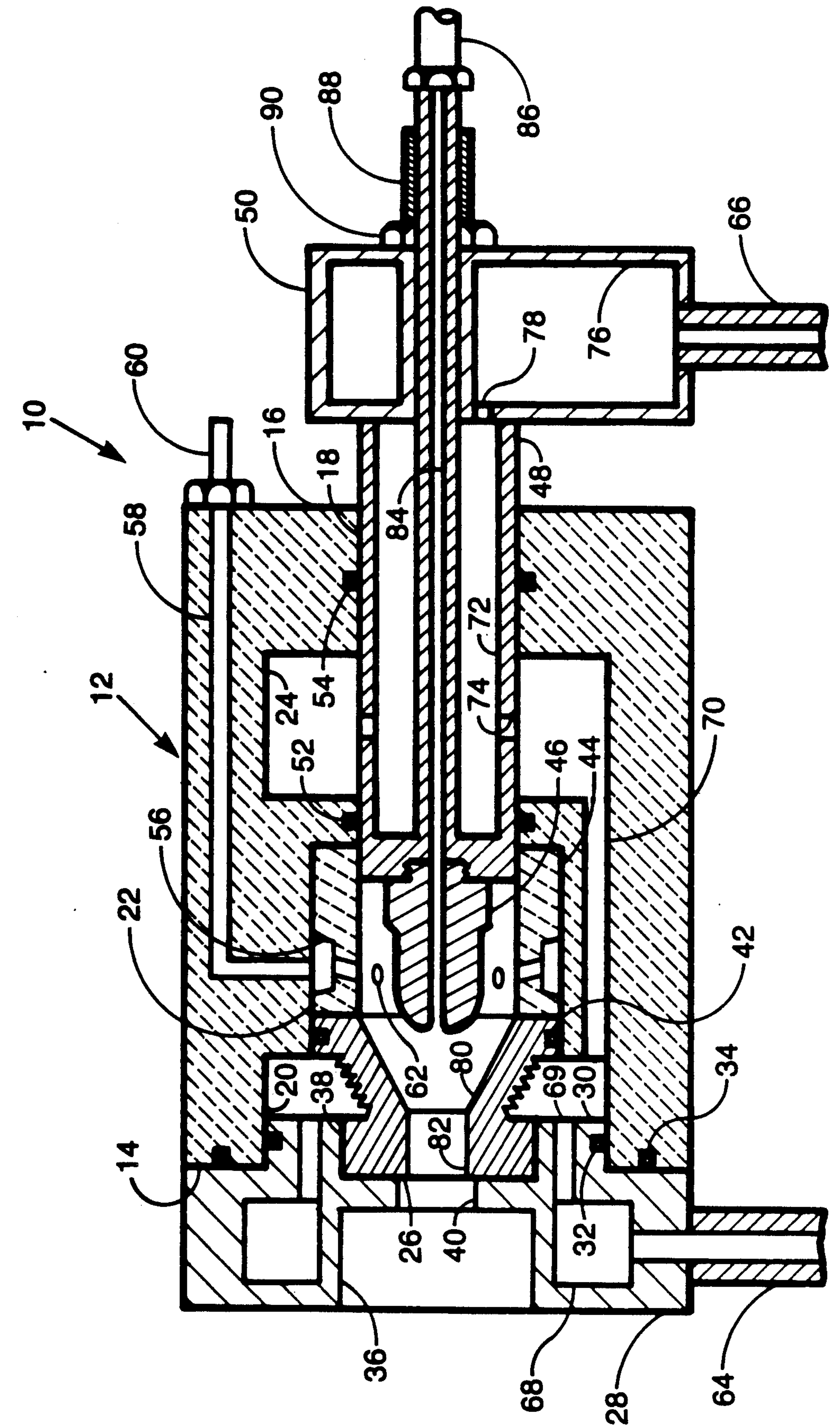
FIG. 2 is a simplified axial sectional view taken along the line 2—2 in FIG. 1.

A plasma gun 10 constructed in accordance with the invention is shown in FIGS. 1 and 2. The body of the gun comprises a housing 12 in the form of an elongated cylindrical insulator having oppositely disposed end faces 14 and 16. An axial bore 18 extends from the rear end face 16 toward the forward end face 14. A recess 20 extends from the forward end face 14 into the housing 12. An enlarged cylindrical bore 22 extends from the bottom of the recess 20 toward the rear of the housing and meets the bore 18. An enlarged chamber 24 having a diameter substantially equal to the diameter of the recess 20 is formed in the housing 14 rearwardly of the enlarged bore 22.

An anode 26 is secured to a metal base 28 mounted on the forward face 14. The base 28 has a rearwardly facing boss 30 which extends into the recess 20 in the housing 12. A suitable sealing ring 32 is provided between the boss 28 and the housing 12. A similar ring 34 is positioned between the base 28 and the housing 12. These rings are of a suitable sealing material, such as rubber.

The base 28 has a pair of oppositely disposed recesses 36 and 38 connected by a centrally disposed opening 40. The recess 36 extends inwardly from the forward face of the anode 28, while the recess 38 extends inwardly from the face of the boss 30. The opening 40 is in substantial alignment with the bore 18 in the housing 12.

The anode 26 has a base mounted in the recess 38 in the boss 30 by suitable screws (not shown), and the anode extends into the bore 22 in the housing 12. A sealing ring 42 is positioned between the anode 26 and the wall of the bore 22. The outermost surface of the anode 26 engages the end face of a tubular refractory insulator 44 positioned in the bore 22.

A cathode 46 has a base threadably mounted on a hollow support 48 carried by a base 50 secured to the rear face 16. The support 48 protrudes from the base 50 into the housing 12 along the axial bore 18. Suitable sealing rings 52 and 54 are provided between the support 48 and housing 12 in the bore 18.

As shown in the drawing, the support 48 extends through the axial bore 18 into the enlarged bore 22. The support 48 further extends into the bore of the refractory insulator 44.

The tubular refractory insulator 44 is inserted into the bore 22 in the housing 12 prior to mounting on the anode 26. A groove 56 machined or cast in the outer peripheral surface of the refractory insulator 44 forms an annular chamber for receiving an ionizable gas from a passage 58 in the housing 12 that is connected to a suitable source 60. A plurality of passages 62 extend from the inner surface of the refractory insulator 44 to this chamber to form a gas ring around the cathode 46.

The temperature of the plasma gun 10 is controlled by a suitable cooling fluid which passes through the various components from a supply line 64 to a discharge line 66 as shown in FIGS. 1 and 2. The cooling fluid from the supply line 64 enters a circular chamber 68 in the anode base 28 and flows into the recess 20 through passages 69. This fluid then flows through a plurality of passages 70 into the chamber 24 which surrounds the cathode support 48.

An interior chamber 72 in the cathode support 48 is in communication with the chamber 24 through a plurality of passages 74. The cooling fluid then flows from the chamber 72 into another cooling chamber 76 in the cathode base 50 through passages 78. This cooling fluid is then discharged through the line 66.

In operation, the flow of cooling fluid is started and arc gas flow is started through the passage 58. A DC potential is established between the cathode 46 and a conical surface 80 on the interior of the anode 26. The ring of passages 62 supplies the ionizable gas to this charged space between the cathode and anode to form a plasma jet which extends through a central bore 82 in the tip anode 26 to the aligned opening 40.

An important feature of the invention is the provision of a centrally disposed passage 84 that extends axially through the cathode 46 and its support 48. This passage 84 is placed in communication with a suitable source 86 of ceramic powders. These particles are carried by a gas and are injected into the plasma jet by way of this coaxial passage 84 so that the particles are injected coaxially into the central portion of the plasma jet. This coaxial injection results in a more uniform and higher temperature of the sprayed particles. This improved injection causes the particles to achieve higher and more uniform velocity.

At the same time, the length of the path of the particles in the plasma jet is increased. In addition, the feed gas from the ring of passages 60 acts as a coolant for the cathode 46, thus extending its life.

Another feature of the invention is the novel mounting of the base 50 of the cathode 46 on the housing 12 so that the spacing between the cathode 46 and the anode 26 is adjustable. This novel mounting provides for optimization of the performance or efficiency of the gun 10 for a given set of gun operating parameters such as power input, arc gas flow, feed gas flow, powder feed rate, and particular material being sprayed.

More particularly, a plurality of studs 88 extend from the rear face 16 of the housing 12 through the base 50 of the cathode. Axial movement of the cathode 46 is accomplished by adjusting a plurality of nuts 90 on the studs 88.

Figure 4:
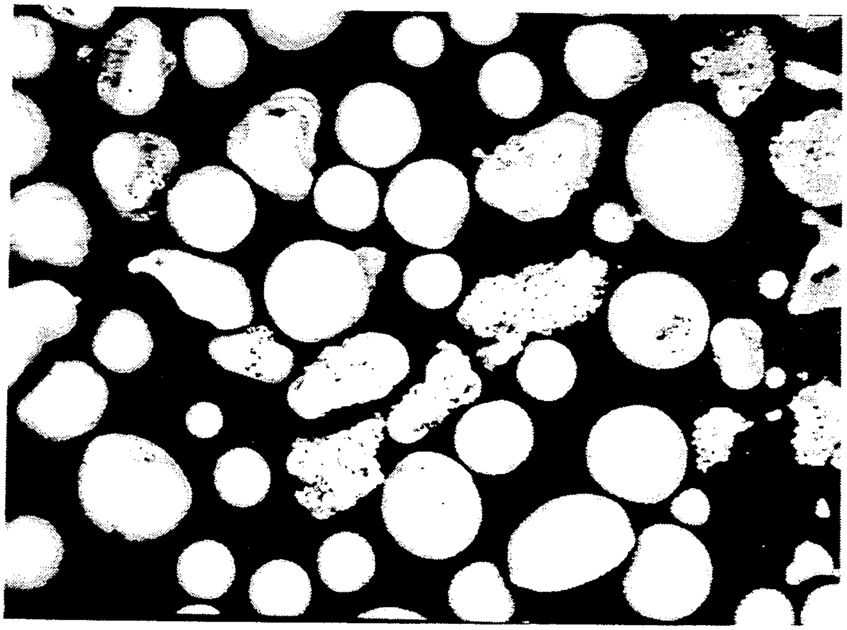
FIG. 4 is a photomicrograph showing the morphology of zirconia particles sprayed into water using a plasma gun embodying the features of the present invention.
Figure 3:
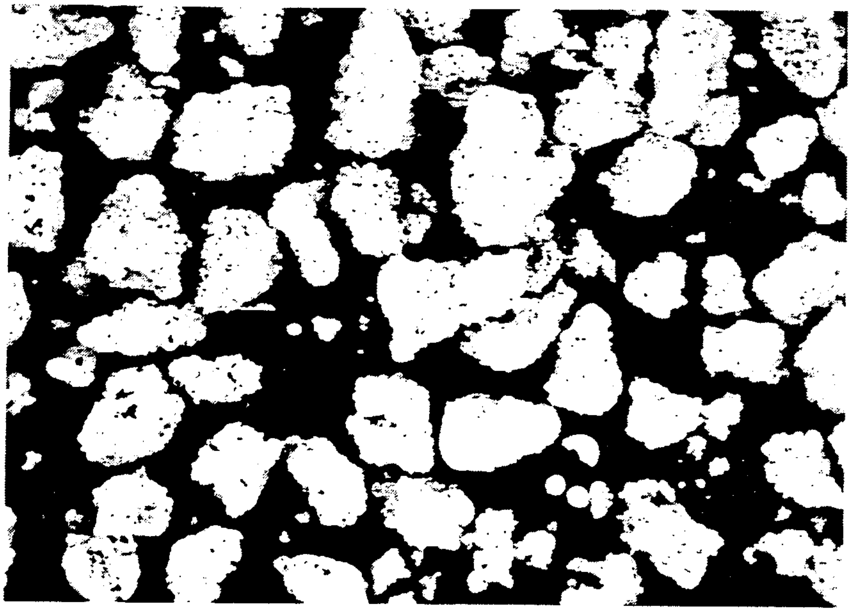
FIG. 3 is a photomicrograph showing the morphology of zirconia particles sprayed into water using a commercially available plasma gun.

Experimental work with the gun 10 has shown that zirconia grains plasma sprayed with the gun after optimization of the arc were melted at considerably lower input levels when compared with commercially available guns. This is illustrated by the 200 magnification photomicrographs in FIGS. 3 and 4. The input power to each gun was 20KW while the arc gas flow was 60 SLM. The zirconia powder was fed to each gun at a rate of 50 grams/minute.

While the preferred embodiment of the invention has been described, it will be appreciated that various structural modifications can be made to the arc plasma gun without departing from the spirit of the invention and the scope of the subjoined claims. By way of example, it is contemplated that the manual cathode adjustment mechanism of this embodiment may be replaced with a remote control.

I claim:

1. An arc plasma gun comprising, a housing in the form of an elongated insulator having oppositely disposed end faces and an axial bore forming a chamber extending therethrough between a forward end face and a rear end face, said chamber having a forward portion adjacent to said forward end face having a major diameter and a rear portion adjacent to said rear end face having a smaller diameter.

an anode having an opening therein, a metal base mounted on said forward end face, said base having a rearwardly facing boss extending into said forward portion of said axial bore for mounting said anode with said opening in substantial alignment with said chamber, an elongated cathode assembly extending into said chamber from the rear and face of said housing toward said anode whereby an arc may be generated, said cathode assembly comprising a base portion adjacent to said rear end face, an elongated body portion extending from said base portion through said rear portion of said chamber into said forward portion, and a cathode mounted on an end of said body portion opposite said base portion, at least one passage in said housing in communication with a source of ionizable gas for supplying the same to said anode and cathode to maintain an arc, a bore extending through said cathode in communication with a source of ceramic powders in a feed gas for feeding said powders to said arc, and a plurality of threaded members extending from said rear end face for operable engagement with said base portion of said cathode assembly whereby said elongated body portion and said cathode are selectively moved in said axial bore toward and away from said anode for optimizing the performance of said gun.

2. An arc plasma gun as claimed in claim 1 including a conical surface on the interior of said anode facing the outermost end portion of said cathode in said forward portion of said axial bore.

3. An arc plasma gun as claimed in claim 2 including a refractory insulating member mounted in said housing in said forward portion of said axial bore for enclosing said conical interior surface of said anode and said cathode.

4. An arc plasma gun as claimed in claim 3 including means in said refractory insulating member for forming a ring of ionizable gas around said arc.

* * * * *